US012485679B2

(12) United States Patent
Mowbray

(10) Patent No.: US 12,485,679 B2
(45) Date of Patent: Dec. 2, 2025

(54) METHOD OF CREATING A PROJECTILE LAUNCHER BY DEPOSITING INK ON SHELL PARTS

(71) Applicant: ZURU IP LIMITED, Kowloon (HK)

(72) Inventor: Mathew Peter Mowbray, Coatesville (NZ)

(73) Assignee: Zuru IP Limited, Kowloon (HK)

( * ) Notice: Subject to any disclaimer, the term of this patent is extended or adjusted under 35 U.S.C. 154(b) by 0 days.

(21) Appl. No.: 17/617,532

(22) PCT Filed: Aug. 25, 2021

(86) PCT No.: PCT/SG2021/050505
§ 371 (c)(1),
(2) Date: Dec. 8, 2021

(87) PCT Pub. No.: WO2023/027625
PCT Pub. Date: Mar. 2, 2023

(65) Prior Publication Data
US 2024/0308242 A1 Sep. 19, 2024

(51) Int. Cl.
*B41J 3/407* (2006.01)
*B41M 1/40* (2006.01)
*B41M 5/00* (2006.01)
*B44F 5/00* (2006.01)
*F41B 11/89* (2013.01)

(52) U.S. Cl.
CPC ............ *B41J 3/40731* (2020.08); *B41M 1/40* (2013.01); *B41M 5/0082* (2013.01); *B44F 5/00* (2013.01); *F41B 11/89* (2013.01)

(58) Field of Classification Search
None
See application file for complete search history.

(56) References Cited

U.S. PATENT DOCUMENTS 5,778,590 A 7/1998 Browning et al.
6,314,954 B1 11/2001 Wang
(Continued)

FOREIGN PATENT DOCUMENTS

DE 102010021279 A1 * 11/2011 ............... A63F 9/12
DE 102010021280 A1 * 11/2011 ............... A63F 9/12

OTHER PUBLICATIONS

English language translation of DE 10 2010 021 279 A1 to Knell, publication date Nov. 24, 2011. (Year: 2011).*
(Continued)

*Primary Examiner* — Leslie J Evanisko
(74) *Attorney, Agent, or Firm* — Finnegan, Henderson, Farabow, Garrett & Dunner LLP

(57) ABSTRACT

A non-lethal projectile launcher toy that comprises a full-colour, high DPI, printed aggregate coating on an outer shell (101, 301); the decal coating is not limited to flat surfaces, allowing for substantially unrestricted product design, and is substantially undisturbed visual continuity when crossing part lines between discrete parts that make up the outer shell. Methods of producing the decal-coated toy gun using inkjet printing technology are also provided, allowing for high-detail and comprehensive colour range aggregate coatings that may be programmatically controlled to maximise the visual quality of the applied decal.

12 Claims, 7 Drawing Sheets

(56) References Cited

U.S. PATENT DOCUMENTS

| | | | | |
|---|---|---|---|---|
| 7,014,284 | B2 * | 3/2006 | Morton | F42B 5/26<br>347/4 |
| 2001/0019340 | A1 | 9/2001 | Kubo et al. | |
| 2010/0041311 | A1 * | 2/2010 | Reiss | A63H 17/26<br>446/484 |
| 2020/0184852 | A1 * | 6/2020 | Hartloff | G09B 27/08 |

OTHER PUBLICATIONS

English language translation of DE 10 2010 021 280 A1 to Knell, publication date Nov. 24, 2011. (Year: 2011).*
English language abstract and full copy of JP 2013-022768 to Ikeda et al., publication date Feb. 4, 2013. (Year: 2013).*
"Ultimate Nerf blaster customization", URL:https://www.youtube.com/watch?v=sIINch-44TE, 3 pages.

* cited by examiner

METHOD OF CREATING A PROJECTILE LAUNCHER BY DEPOSITING INK ON SHELL PARTS

CROSS-REFERENCE TO PRIOR APPLICATIONS

This application is a National Stage of PCT/SG2021/050505, filed Aug. 25, 2021, hereby expressly incorporated by reference in its entirety.

TECHNICAL FIELD

This invention relates to the field of printing, particularly digital inkjet printing. Additionally, this invention relates to the field of non-lethal projectile launchers, particularly foam projectile launchers, water blasters, airsoft guns, and paintball guns.

BACKGROUND

Non-lethal projectile launchers are a popular product in the toy market and sports market; non-lethal projectile launchers may be split into two key categories: toy projectile launchers and hobby projectile launchers. Hereinbefore or after, when referring to a 'projectile launcher', said projectile launcher is a non-lethal projectile launcher, such the projectile launcher is designed to be non-lethal toward humans.

Toy projectile launchers may fire one of various projectiles including, but not limited to: jets of water, foam darts with rubber tips, foam darts with suction pad tips, foam balls, foam discs. Each of these projectile types are launched at a non-lethal velocity and are often relatively painless; foam projectiles such as darts, balls, and discs are often designed to prioritise projectile distance, such as 10 m to 30 m, while maintaining a light impact force; this light impact force allows these projectile launchers to be suitable for children, provided they are above a minimum recommended age. Furthermore, projectiles of toy projectile launchers may include digital projectiles such as battery-powered laser tag toys; these laser tag toy projectile launchers may utilise various technologies, although they most commonly use directional infrared light that is sensed by infrared sensors on other laser tag toy projectile launchers or accompanying vests.

Hobby projectile launchers, such as airsoft guns or paintball guns, may fire one of various projectiles including, but not limited to: airsoft 'BB' balls, and paintballs. Airsoft guns and paintball guns fire their projectiles much faster and further than toy projectile launchers, resulting in higher impact force that can be significantly painful, although still non-lethal. Due to the higher impact force, airsoft and paintball guns are generally restricted to teenagers and adults.

Toy projectile launchers are assembled from multiple injection moulded plastic parts that mate together to form the body of the toy. These parts may mate together using one or more methods such as: Screws, one-way clips, glue, snap locks, or other fastening methods. These plastic parts usually fit together at a mid-plane spanning the middle of the toy, commonly referred to as the part line.

Hobby projectile launchers may also be assembled from injection moulded parts although many comprise a metal structure instead, or even a composite metal and plastic structure; hobby projectile launchers are generally more complicated assemblies to house more advanced projectile loading mechanisms and higher performing projectile launching mechanisms.

Toy projectile launchers are commonly powered by a spring-loaded mechanism, which may be cocked by either a manual action by the user, or by an automatic electromechanical mechanism; most toy projectile launchers utilise a manual cocking action to be able to provide a low-cost product, however more premium toy projectile launchers boast rapid fire and/or self-repeating firing modes by utilising an automatic cocking electromechanical mechanism. In the case of water blasters, they use a pressurised reservoir that may be pressurised using a motorised pump, or a hand operated pump, and a trigger that opens an outlet to release pressure and consequently jet out the pressurised material, in this case being water. Additionally, some toy projectile launchers do not have mechanical projectile launching systems, such as laser tag guns that utilise electromagnetic emitters such as infrared beams powered by batteries.

Toy projectile launchers are generally designed to be a caricature of guns, with an emphasis on bold, exciting profiles, and vibrant colours to appeal toward teenagers and children. Due to the construction of toy projectile launchers being from injection moulded plastic, most of the product design is influenced by the shape of each injection moulded part, and the colour of plastic used to mould each outer shell part; this limits the nuance of the design to be limited by the part size and the consequent number of parts in the assembly. Finer design details are often included in toy projectile launcher designs, but are achieved using stickers, or simple pad printing of embossed geometry, such as embossed text.

Hobby projectile launchers are predominantly designed to mimic military-grade guns, although are often required to include identifying markers such as bright orange barrel ends so they are not mistaken as a lethal weapon; this design mimicry leads to more serious and realistic products to appeal toward hobbyists. Some hobby projectile launchers are manufactured to comprise painted camouflage or basic colours, such as tan or green, to provide more exciting design details while maintaining authenticity; additionally, many hobbyists may custom paint their airsoft or paintball gun to add flare and personality to it.

Creating a decal on an object or surface may be accomplished using various materials and methods, each with different functional benefits and surface finishes; methods may include, but are not limited to, 'pad printing', 'screen printing', 'transfer printing', 'oil-based paints', 'water-based paints', 'spray paints', 'inkjet printing', 'toner-based laser printing', 'shrink wrap', 'sticker', and 'vinyl wrap'.

When deciding on methods for applying a decal onto an object or surface, key factors to compare include, but not limited to cost, technological complexity, degree-of-automation, surface geometry limitations, and quality, wherein quality may include resolution, colour-range, colour brightness, and surface finish.

Pad printing is a cheap printing method and can print on contoured surfaces due to the compliant pad, however, pad printing is often applied on embossed geometry since it otherwise may result in feathered edges on flat surfaces; additionally, complex images are not feasible and pad printing is generally a single colour per pad. Pad printing may be implemented using a manual process or automated process.

Screen printing is limited to a single colour per screen and is not ideal for irregular surfaces; however, it does provide sharp transition edges due to the use of a stencil. Pad printing may be implemented using a manual process or automated process, however automation for printing on objects comprising irregular surfaces would increase the technological complexity.

Transfer printing is an expensive printing method, primarily due to the materials involved with the process and an inherent need for manual labour. It can create high quality decals, although the positional accuracy is difficult, so it is generally limited to applying a decal to an entire surface, rather than a selectable region.

Spray painting is used for various use-cases and may be manually used or automated, although it is often used for full coats when automated, rather than mixed colours; in the automobile industry, spray painting is used to coat the panels of the vehicle. Spray painting is an expensive material and generally not used unless trying to coat an entire surface with a uniform colour.

Stickers provide high quality images on the sticker itself due to using inkjet or laser printing on its surface, although they may still appear cheap and can wear easily; stickers can peel at the edges, are vulnerable to water damage, and can appear misaligned if not applied precisely. Furthermore, stickers cause an apparent edge on the surface it is applied on, which does not look or feel pleasing upon close inspection.

Inkjet printing uses 3 colours and a black ink to be able to print a wide range of colours and shades at a resolution of a certain DPI (Dots Per Inch). Inkjet printing is a fully automated process that has a high-quality finish and can be available using either dye-based inks or pigment-based inks, which can expand the range of materials that can be printed onto.

Inkjet printing is digitally controlled, thus allowing for quick and cheap changes to the printed decal, or even 'made-to-order' products wherein the printed decal is specifiable for each unit such that a customer may order a custom toy projectile launcher comprising a decal image they provide.

Considering the preceding text, therein exists a need for projectile launcher that comprises a detailed decal that cohesively coats a substantial area of said projectile launcher; specifically, a need exists for a toy projectile launcher that comprises a detailed decal that cohesively coats a substantial area of said toy projectile launcher and is not restricted by part lines or angled surfaces, wherein said toy projectile launcher would otherwise comprise a body assembled from plastic segments, each a single base colour, with minimal pad printing and/or stickers.

Consequently, a need also exists for a method to produce a decal-coated projectile launcher, specifically a projectile launcher that comprises surfaces at various relative angles that receive a decal coating. Furthermore, said a need exists for said method to be able to produce a decal-coated projectile launcher such that the decal coating appears visually continuous between discrete outer shell parts such that the visual continuity is not substantially interrupted by abutting faces or part lines between said discrete outer shell parts.

SUMMARY OF THE INVENTION

In a first aspect the present invention may be said to be a projectile launcher comprising: at least two abutting shell parts that form at least part of an outer shell of said projectile launcher, wherein a first of said shell parts has an outer surface (herein after "first surface") that is contiguous an outer surface (herein after "second surface") of a second of said shell parts; an aggregate coating comprising at least two sub-coatings, a first sub-coating is carried at said first surface by said first shell part and a second sub-coating is carried at said second surface by said second shell part.

In a further aspect the present invention may be said to be an outer shell of or for a projectile launcher comprising: at least two abutting shell parts that form at least part of an outer shell of said projectile launcher, wherein a first of said shell parts has an outer surface (herein after "first surface") that is contiguous an outer surface (herein after "second surface") of a second of said shell parts; an aggregate coating comprising at least two sub-coatings, a first sub-coating is carried at said first surface by said first shell part and a second sub-coating is carried at said second surface by said second shell part.

Preferably said first sub-coating and said second sub-coating are contiguous.

Preferably said first sub-coating and said second sub-coating are contiguous at where the first and second surfaces are contiguous.

Preferably the first surface of the first shell part has an edge that is contiguous an edge of the second surface of the second shell part, the first sub-coating is carried at said first surface to its edge and a second sub-coating is carried at said second surface to its edge.

Preferably the aggregate coating is physical but not visually interrupted at adjacent edges of the first and second surfaces.

Preferably the first surface and second surface generally extend away from each other, from where they are contiguous, in non-parallel directions.

Preferably the shell parts generally extend away from each other, from where their first and second surfaces are contiguous, in non-parallel directions.

Preferably said first shell parts extends generally laterally away from the second shell part.

Preferably said first shell parts extends generally away from the second shell part at 90°.

Preferably there are at least three shell parts of said projectile launcher, said first part, said second part and a third part also comprising of an outer surface, wherein said second part is in abutment with said first and third part and spans between said first and third parts.

Preferably the outer surface of said first and third parts present in opposed directions to each other.

Preferably the direction of the span presents the outer surface of said second part in a direction perpendicular to the opposed directions.

Preferable the second part is a bridge part that spans between first and third parts that define the sides of the outer shell of the projectile launcher.

Preferably at least one of said first surface and second surface comprises of at least one outer face that has at least two non-parallel normals.

Preferably at least one of said first surface and second surface comprises of a curved outer face.

Preferably at least one of said first surface and second surface comprises of a curved outer face of said at least two non-normals.

Preferably both said first surface and second surface respectively comprises of at least one outer face that has at least two non-parallel normal.

Preferably at least one of said first surface and second surface comprises of two or more outer faces that are inclined to each other.

Preferably said at least one of said first surface and second surface comprises of at least two outer faces that each have a normal that are not parallel each other.

Preferably both said first surface and second surface respectively comprises of two or more outer faces that are not parallel or co-planar to each other.

Preferably an edge is defined of said outer shell along and at where said first and second surfaces are in abutment.

Preferably both said first surface and second surface respectively comprises of two or more outer faces that are inclined to each other.

Preferably a said sub-coating is carried by and continuously across at least part of said at least one outer face.

Preferably said sub-coating is carried by and continuously across at least part of the two or more outer faces of at least one and preferably each outer surface.

Preferably the first and second surfaces have had their respective sub-coatings received independently.

Preferably the first and second surfaces have had their respective sub-coatings applied by a printing process.

Preferably the printing process is as herein described . . . .

Preferably each shell parts notionally comprises a first and second direction that are perpendicular to each other and a third direction that is orthogonal to the first and second direction wherein said sub-coating spans no greater than 30 mm in the third direction.

Preferably at least one of said shell parts has its sub-coating applied to at least part of its outer surface within a region of two notional parallel planes no greater than 30 mm apart.

Preferably a first and second of said shell parts respectively have their sub-coating applied to at least part of its outer surface within a region of two notional parallel planes no greater than 30 mm apart.

Preferably at least one of said shell parts has its two faces at where sub-coating is applied within a region of two notional parallel planes no greater than 30 mm apart.

Preferably at least one and preferably each of said shell parts is shaped and configured so that its two faces are contained within a region of two notional parallel planes no greater than 30 mm apart.

Preferably at least one and preferably each of said shell parts is shaped and configured so that its two surfaces carrying said sub-coating are contained within a region of two notional parallel planes no greater than 30 mm apart.

Preferably the first outer face is inclined to a second outer face at an angle of less than 60° and on both of which a said sub-coating is carried.

Preferably the first surface has at least one outer face of a profile with no-normal thereof projecting at an angle greater than 60° of any normal of a profile of at least one outer face of said second surface.

Preferably the first surface has at least one outer face of a profile at where said first sub-coating is carried with no normal thereof projecting at an angle greater than 60° of any normal of a profile of at least one outer face at where said second coating of said second surface is carried.

Preferably the first surface has a profile at where said first sub-coating is carried and said second surface has a profile at where said second sub-coating is carried wherein the profile of said first surface has no normal thereof projecting at an angle greater than 60° of any normal of the profile of the second surface.

Preferably said profiles are contained within two notional parallel planes no greater than 30 mm part.

Preferably said sub-coating of each said respective shell part is contained within two notional parallel planes no greater than 30 mm part.

Preferably each shell part comprises a top printing plane, and a bottom printing plane, wherein the top printing plane is coincident with a point on an outer face that comprises the sub-coating, and the bottom printing plane is coincident with a point on an outer face that comprises the sub-coating, wherein all of said two or more outer faces that comprise the sub-coating are between said top printing plane and said bottom printing plane, wherein said top printing plane and said bottom printing plane are spaced apart less or equal to 30 mm.

Preferably each shell part has been independently coated with a sub-coating by a printing process that deposits ink from one direction onto an outer surface of the shell part. The range, in the one direction of the sub-coating on the outer surface is no greater than 30 mm.

Preferably each said two or more outer faces that comprise said decal coating are not inclined to said top printing plane by more than 60°.

Preferably said aggregate coating comprises at least one graphical element, wherein said graphical element is continuous across the contiguous surfaces of abutting shell parts.

Preferably said aggregate coating comprises at least one graphical element, wherein said graphical element comprises one or more contours, wherein said graphical element is continuous across the contiguous surfaces of abutting shell parts.

Preferably said shell parts each carry as said sub-coating, wherein said contours are substantially undisturbed across said joining lines.

Preferably a point on said second outer face is spaced along a direction orthogonal to said first outer face by a dimension greater than 30 mm.

Preferably at least one sub-coating comprises a plurality of colours.

Preferably at least one sub-coating comprises a glazed outermost layer.

Preferably at least one sub-coating is applied in at least one pass.

Preferably said two or more shell parts that comprises of substantially opaque plastic, wherein said plastic is substantially white.

Preferably the first sub-coating has been printed onto said first surface and the second sub-coating has been printed onto said second surface.

Preferably the first sub-coating has been printed onto said first surface by a printing process as herein described and the second sub-coating has been printed onto said second surface by the same printing process.

Preferably the aggregate coating is a coating that is an aggregate of said at least two sub-coatings.

Preferably the sub-coatings present indicia that as an aggregate visually appear continuous across said contiguous first and second surfaces at where the sub-coating is applied.

Preferably the aggregate coating present indicia that visually appears continuous as said aggregate coating, across said contiguous first and second surfaces at where the sub-coatings are carried.

Preferably said aggregate coating does not span over the interface of the two abutting shell parts.

Preferably the first sub-coating extends across said first surface.

Preferably the second sub-coating extends across said second surface.

Preferably the sub-coating carried by each respective shell part extends across the respective surface of said shell part.

Preferably the first sub-coating is co-extensive to said first surface.

Preferably the second sub-coating is co-extensive to said second surface.

Preferably the sub-coating carried by each respective shell part is co-extensive the respective surface of said shell part.

Preferably the aggregate coating covers at least part of both said at least two shell parts.

Preferably the aggregate coating extends across at least part of both said at least two shell parts.

Preferably the aggregate coating covers said at least two shell parts.

Preferably the aggregate coating obscures the at least two shell part from being outwardly visible.

Preferably there are at least three said shell parts.

In a further aspect the present invention may be said to be a method of creating a projectile launcher comprising of two abutting shell parts, a first shell part having an outer surface (herein after "first surface") that is contiguous an outer surface (herein after "second surface") of a second shell part, to define at least part of the outer shell of the projectile launcher, the method comprising: when said two shell parts are separated from each other, printing a sub-coating on the first surface and printing a sub-coating on the second surface; assembling said shell parts to abut each other and to position said sub-coatings contiguous of each other to define an aggregate coating on said outer shell that is visually continuous including at where the sub-coatings are positioned contiguous of each other.

Preferably said sub-coatings are applied by ink deposition printing, the direction from which the deposition of ink was received of one of said shell parts is, when said shell parts are assembled, at between 30° and 120° to the direction from which the deposition of ink was received of the abutting shell part.

Preferably as least one of said first and second surfaces has a plurality of faces, said printing occurring by way of ink deposition on said faces that present so that the angle of incidence of ink deposition on said faces is no greater than 60°.

Preferably the angle of incidence of ink deposition is at less than 60° to the first and second surfaces.

Preferably the direction from which the deposition of ink is/was received of one of said components is, when said component is assembled, at between 30 and 120° to the direction from which the deposition of ink is/was received of the abutting component.

In a further aspect the present invention may be said to be a projectile launcher comprising an outer shell assembled from at least two shell parts that when assembled define contiguous first and second outer surfaces respectively each ink deposition printed to establish a first and second sub-coating on said first and second shell parts respectively prior to being assembled from a direction that when said two parts are assembled, are between 30° and 120° to the direction from which the deposition of ink was received.

In a further aspect the present invention may be said to be a method of producing an outer shell of a projectile launcher comprising: receiving at least two shell parts, wherein each shell part comprises an outer surface; depositing ink onto the outer surface of each of at least two of said shell parts, forming a sub-coating on each outer surface of said shell parts; assembling said shell parts together to form at least a part of the outer shell of said projectile launcher, wherein at least two shell parts that each comprise a sub-coating are abutting, and wherein said sub-coatings are contiguous.

Preferably for each shell part, said ink is deposited along a printing direction onto said outer surface at any point on the outer surface between a top height and a bottom height of a said sub-coating, wherein said top height and bottom height are less than 30 mm apart.

Preferably for each shell part, said ink is deposited along a printing direction onto said outer surface at any point on the outer surface that comprises a normal direction that is angled to said printing direction by an angle of less than 60°.

Preferably for each said shell part, the angle of incidence of ink deposited onto said outer surface is less than 60°.

Preferably said ink is UV curable, wherein said method further comprises curing the ink on each shell part with UV light, prior to assembly of the outer shell.

Preferably said ink is a pigment-based ink.

Preferably the ink deposited onto each outer surface is cumulatively deposited across a plurality of print passes.

Preferably for a said sub-coating, a number of print passes during which ink is deposited onto a point on said outer surface that a direction of printing is normal to, is less than a number of print passes during which ink is deposited onto a point on said outer surface that said direction of printing is angled to.

Preferably said ink is deposited using an inkjet printer.

Preferably said each inkjet printing is a piezo electric inkjet printer.

Preferably the method further comprising receiving at least one said shell part onto a jig tray, wherein said jig tray is shaped and configured to allow said shell parts to register with the jig tray for subsequent printing.

Preferably said jig tray comprises a fixture that accurately fixes a location and an orientation of said shell part relative to a reference point of said jig tray.

Preferably said jig tray is shaped and configured to receive a plurality of said shell parts to allow said plurality of shell parts to register with said jig tray for subsequent printing.

Preferably said jig tray comprises fixtures that accurately fixes a location and an orientation of each of said plurality of shell parts relative to a reference point of said jig tray.

Preferably said ink is deposited onto said shell parts while said shell parts are received by said jigs.

Preferably the projectile launcher is a decal-coated projectile launcher.

Herein described may also be a method of producing a decal-coated projectile launcher comprising: receiving at least two shell parts, wherein each shell part comprises an outer surface; assembling said shell parts together to form at least a part of the outer shell of said projectile launcher; printing ink onto the outer surface of each of at least two of said shell parts, forming a coating on each outer surface of said shell parts.

Preferably the coating is an aggregate coating of at least two sub-coatings, a first sub-coating applied to the outer surface (herein after "first surface") of a first of said shell parts and a second sub-coating applied to the outer surface (herein after "second surface") of a second of said shell parts.

Preferably said sub-coatings are contiguous.

Preferably multiple printing passes that cumulatively form the decal coating, wherein during at least one of said additional printing passes the outer shell may be in a position other than the first position and said outer shell may be in an orientation other than the first orientation.

Preferably the method comprises prior to assembling, injection-moulding said plurality of shell parts, wherein said shell parts are plastic.

Preferably the method further comprises assembling additional components, prior to the first printing pass, wherein said components are partially, or completely, housed within the outer shell, wherein ink is not deposited onto said components.

Preferably said ink is UV curable, wherein said method further comprises curing the ink the outer shell with UV light.

Preferably the decal coating on the outer shell coats a plurality of the shell parts, wherein the ink deposited onto a first shell part of the outer shell contacts an outer edge of said first shell part and the ink deposited onto a second shell part of the outer shell contacts an outer edge of said second shell part, wherein said outer edges are adjacent, wherein the decal coating is continuous across the said first shell part and said second shell part.

Preferably said ink is deposited using an inkjet.

Preferably said each inkjet printing is a piezo electric inkjet printer.

Preferably the outer shell is electromechanically manipulated to transition between each said position.

In a further aspect the present invention may be said to be a projectile launcher assembled from outer shell parts created by the method or methods as herein defined.

Preferably the decal coating comprises a plurality of colours.

Preferably one or more non-printable or non-printed shell parts that do not comprise a said sub-coating, wherein said non-printable shell parts are made of a plastic, wherein said plastic provides a base colour.

Preferably one or more non-printable shell parts comprise a first outer face and a second outer face, wherein said second outer face is inclined to said first outer face greater than 60°.

Preferably said sub-coatings comprises of one of the following substances: Pigment-Based Ink, Dye-Based Ink, Oil-Based Paint, Alcohol-Based Paint, or Water-Based Paint.

Preferably a surface herein defined may comprise at least two faces, wherein each said face is a planar portion of said surface, wherein each face is adjacent to at least one other face, wherein each face is non-parallel to said adjacent faces.

In a further aspect the present invention may be said to be a toy projectile launcher comprising of a plurality of outer plastic shell parts connected together in an abutting relationship to define at least part of an outer shell of the toy projectile launcher on which a coating is printed on at least part of two shell parts.

In a further aspect the present invention may be said to be a toy projectile launcher comprising of a plurality of outer plastic shell parts connected together in an abutting relationship to define at least part of an outer shell of the toy projectile launcher on which an aggregate coating is printed on at least part of two abutting shell parts In a further aspect the present invention may be said to be a toy projectile launcher comprising of a plurality of outer plastic shell parts connected together in an abutting relationship to define at least part of an outer shell of the toy projectile launcher on which an aggregate coating is printed on and spanning across at least part of two abutting shell parts.

In a further aspect the present invention may be said to be a toy projectile launcher comprising of a plurality of outer plastic shell parts connected together in an abutting relationship to define at least part of an outer shell of the toy projectile launcher on which an image is printed spanning across at least part of two abutting shell parts.

In a further aspect the present invention may be said to be a toy projectile launcher comprising of a plurality of outer plastic shell parts connected together in an abutting relationship to define at least part of an outer shell of the toy projectile launcher and comprising an aggregate decal coating on exterior facing surfaces of said shell parts that extends across the interface of abutting shell parts and defined by printed sub coatings on said outer shell parts applied prior to said shell parts being connected together and that when connected together present said sub coatings in a contiguous manner.

Preferably the contiguous sub coatings define said aggregate decal coating as a whole.

In a further aspect the present invention may be said to be a toy projectile launcher comprising of a plurality of outer plastic shell parts connected together in an abutting relationship to define at least part of an outer shell of the toy projectile launcher on (and preferably at least across at least part of two abutting shell parts) which an exteriorly visible decal coating is printed comprised of a plurality of sub coatings printed onto said shell parts.

Preferably said decal coating extends across at least part of two abutting shell parts including at the interface of the shell parts at where they abut each other.

Preferably said shell parts have had their respective sub coatings printed prior to be being brought into an abutting relationship with each other.

Preferably said shell parts are printed with a respective sub coating when apart from each other.

Preferably said printed sub coatings on said outer shell parts are applied prior to said shell parts being connected together and that when connected together present said sub coatings in a contiguous manner.

Preferably there are at least 3 shell parts in serially abutting each other, each spanning in an orthogonal direction to the or each adjacent abutting shell part.

Preferably the aggregate coating comprises of at least two sub coatings.

Preferably the sub coatings are positioned adjacent and contiguous each other.

Preferably the sub coatings are positioned adjacent and contiguous each other on respective shell parts.

Preferably said image is defined by an aggregate coating defined by sub coatings. Preferably the sub coatings are contiguous each other.

Preferably said sub coatings are printed using a digital file. Preferably the digital file is created using a computer aided graphic design process. Preferably the digital file is created using a graphic design program using a computer.

Preferably the sub coating visually presents to a person an image on the exterior of the shell. Preferably the image is a replica of part of the exterior of a non-toy projectile launcher.

Preferably the image is representative of one selected from:

a) a lightning bolt,
b) stripes,
c) part of a person or caricature of part of a person,
d) part of an animal or caricature of part of an animal,
e) part of the exterior of a gun or weapon (such as a magazine cartridge)
f) camouflage, and
g) words or a logo or other indicia.

Preferably the aggregate coating visually represents one selected from:

a) a lightning bolt,
b) stripes, c) part of a person or caricature of part of a person, d) part of an animal or caricature of part of an animal, e) part of the exterior of a gun or weapon (such as a magazine cartridge)

f) camouflage, and g) words or a logo or other indicia.

Additional features and advantages of the invention will be set forth in the description which follows, and in part will be apparent from the description, or may be learned by practice of the invention. The objectives and other advantages of the invention will be realised and attained by the structure particularly pointed out in the written description and claims hereof as well as the appended figures.

It is to be understood that both the foregoing general description and the following detailed description are exemplary and explanatory and are intended to provide further explanation of the invention as claimed.

DESCRIPTION OF THE DRAWINGS

The accompanying drawings, which are included to provide further understanding of the invention are incorporated and constitute a part of this specification, illustrate embodiments of the invention and together with the description, serve to explain the principles of the invention.

In the drawings.

DETAILED DESCRIPTION OF THE INVENTION

Figure 1:
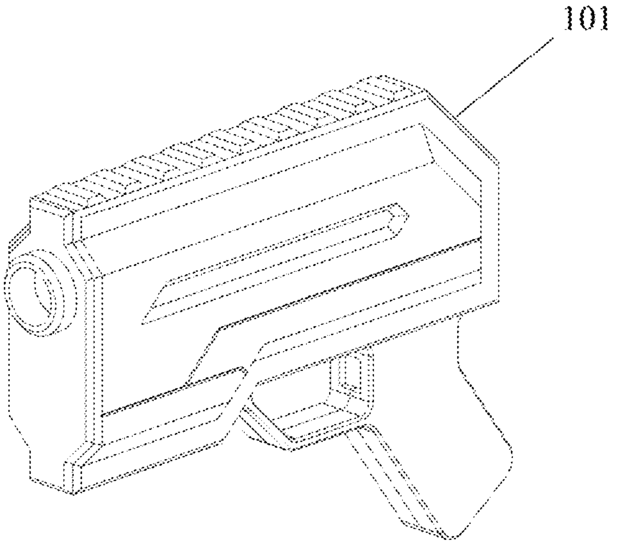
FIG. 1 displays a front three-quarter view of a projectile launcher outer shell that is optimised to be able to receive sub-coatings on multiple shell parts.

As used hereinbefore or after, when referring to a shell part of a projectile launcher, 'shell part' or 'outer shell part' refers to a part that may form a discrete portion of an outer surface of the projectile launcher.

As used hereinbefore or after, when referring to an outer shell of a projectile launcher, 'outer shell' refers to an assembly comprising a plurality of shell parts that collectively form all, or a substantial portion, of the outer-facing surfaces of the projectile launcher and disregards discrete parts that make up internal mechanisms or housing surfaces that are entirely occluded by outer parts.

As used hereinbefore or after, when referring to a sub-coating of a shell part or of an aggregate coating, 'sub-coating' refers to a digitally rasterised printed coating on an outer surface of a shell part, such that the sub-coating is received by a discrete shell part and does not physically span to other shell parts.

As used hereinbefore or after, when referring to an aggregate coating of a decal-coated projectile launcher or an outer shell or a plurality of shell parts, 'aggregate coating' refers to a coating made up of multiple sub-coatings, wherein the sub-coatings may abut other sub-coatings to provide an apparent continuity between discrete shell parts, and may also comprise common decal elements that are duplicated throughout said sub-coatings, or span between said sub-coatings; such abutment, and/or visual similarity, results in visual coherence providing an aggregate coating.

As used hereinbefore or after, when referring to a decal-coated shell part, outer shell, or projectile launcher, 'decal-coated' refers to the presence of an aggregate coating and/or a sub-coating on said shell part, outer shell, or projectile launcher.

As used hereinbefore of after, when referring to a decal element of a sub-coating or an aggregate coating, 'decal element' refers to a graphical element that may be discernible as a discrete sprite, layer, component, or object within a sub-coating or aggregate coating.

As used hereinbefore or after, when referring to a background decal element of a sub-coating or an aggregate coating, 'background decal element' refers to a decal element that serves as part of a base texture or base pattern. Examples of background decal elements may include, but are not limited to, one or more solid colours, one or more colours forming a gradient, a pattern, an image, text, 2D or 3D shapes.

As used hereinbefore or after, when referring to a foreground decal element of a sub-coating or an aggregate coating, 'foreground decal element' refers to a decal element that serves as a focal point, or primary graphical element within a sub-coating or aggregate coating, over top one or more background decal elements. Examples of foreground decal elements may include, but are not limited to, logos, text, icons, images, 2D or 3D shapes, characters, animals, plants, or natural elements such as fire or lightning.

As used hereinbefore or after, when referring to a printing pass of a printing method, 'printing pass' may refer to either: firstly, one of multiple printing operations of applying a decal onto an article in a single position, wherein the decal is made up of multiple printed layers to create a thicker final layer, or secondly one of multiple printing operations of applying a decal onto an article, wherein the article may be in varying positions and/or orientation during each said printing operation, and each said printing operation may deposit multiple layers of material.

As used hereinbefore or after, when referring to a printing plane of a printing method, ‘printing plane’ refers to a plane that is orthogonal to a direction of a jet of ink, or alternative printing deposition, and, when printing onto a surface, the printing plane is coincident to an impact point of said jet of ink on the surface.

The invention as disclosed in its current form comprises of: A projectile launcher assembled from a plurality of shell parts, with one or more of the shell parts having a sub-coating on it. The geometry of the decal-coated shell parts is optimised to facilitate the sub-coating in a way that substantially obviates visual distortion and voids in the applied decal.

Figure 2:
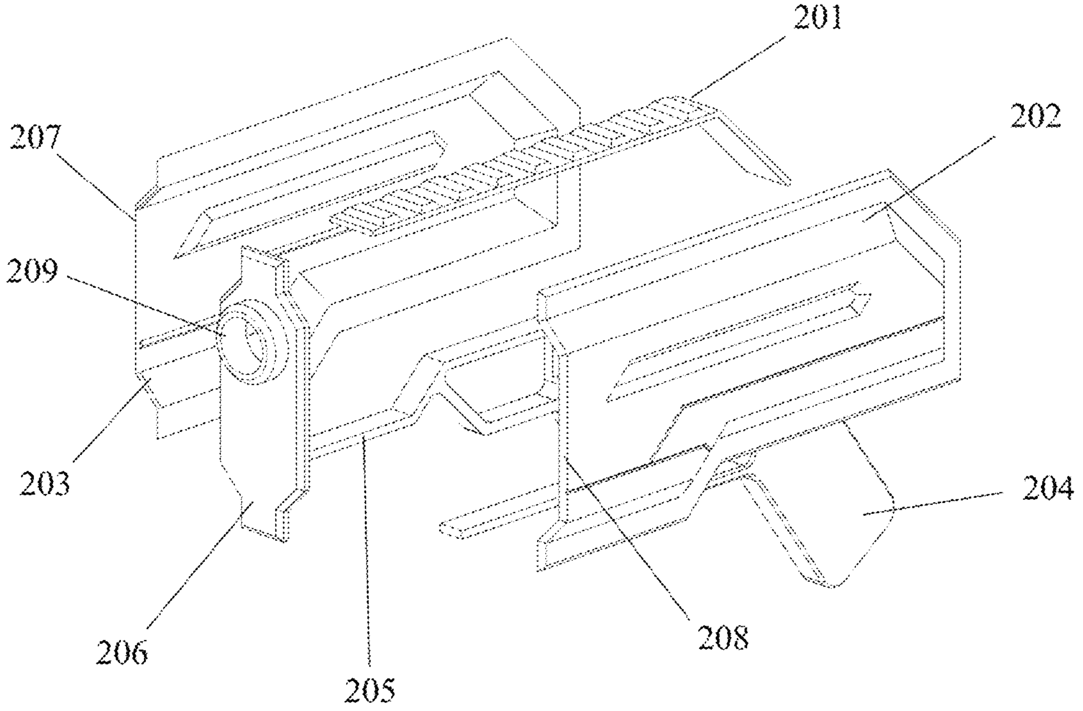
FIG. 2 displays an exploded front three-quarter view of the projectile launcher outer shell from FIG. 1.
Figure 3:
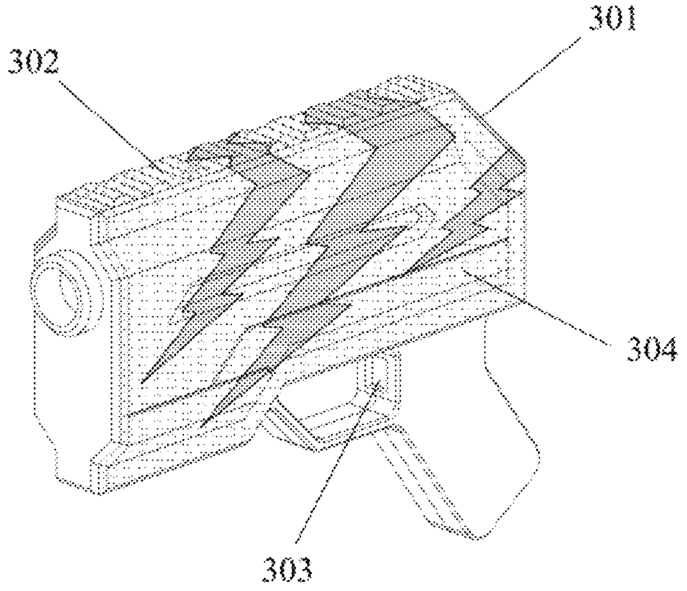
FIG. 3 displays a front three-quarter view of an outer shell of a preferred embodiment of a decal-coated projectile launcher, with said view illustrating an aggregate coating across a plurality of outer shell parts.
Figure 4:
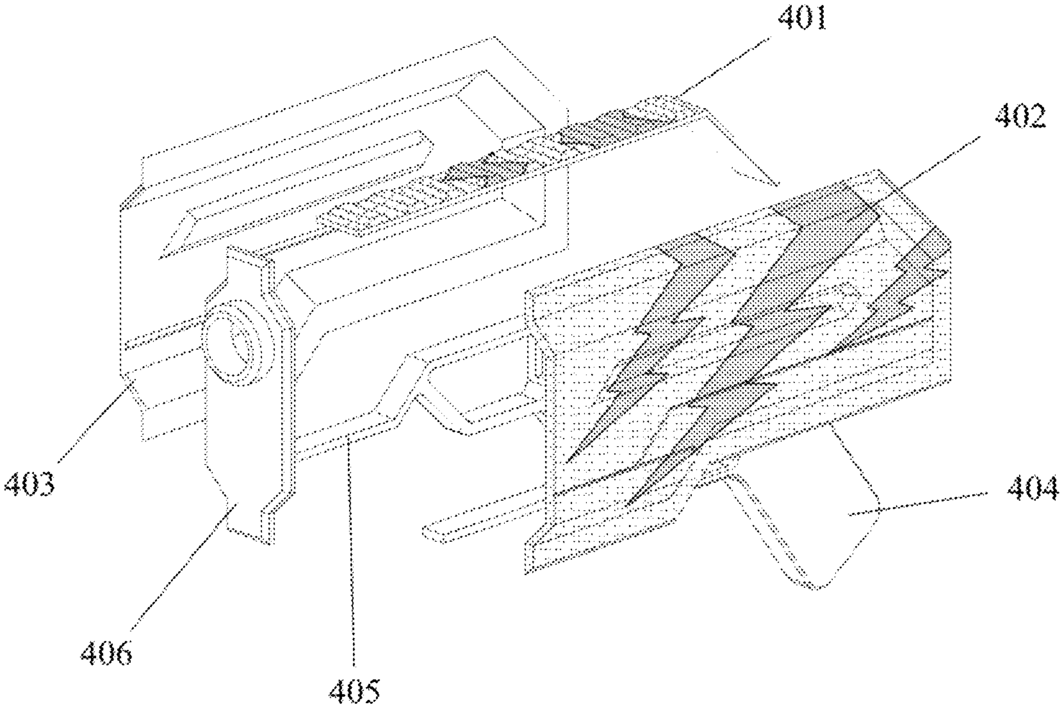
FIG. 4 displays an exploded front three-quarter view of the outer shell of the embodiment, with said view illustrating an aggregate coating across a plurality of outer shell parts.
Figure 5:
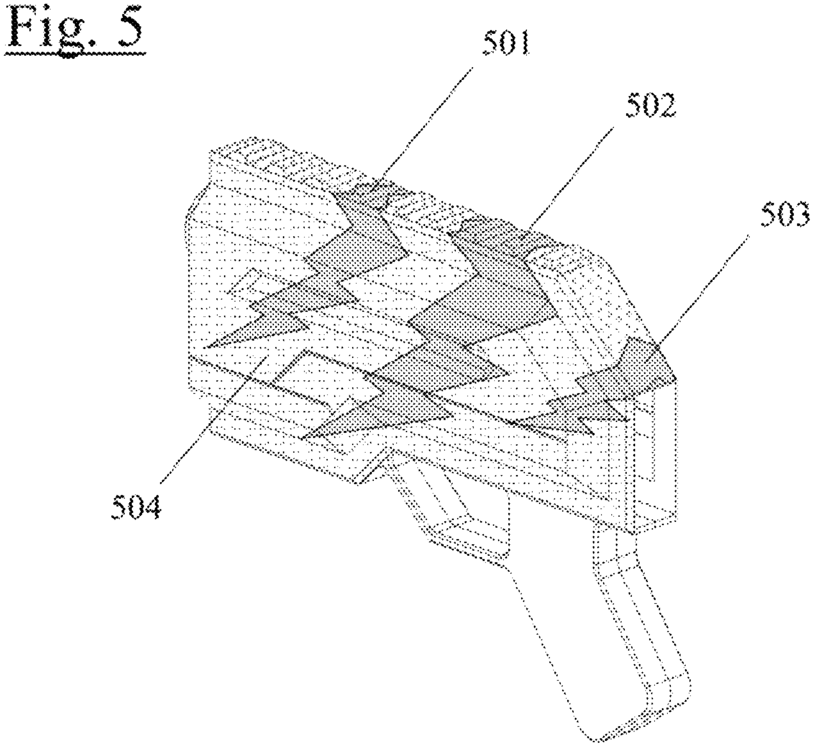
FIG. 5 displays a rear three-quarter view of the outer shell of the embodiment, with said view illustrating an aggregate coating across a plurality of outer shell parts.
Figure 6:
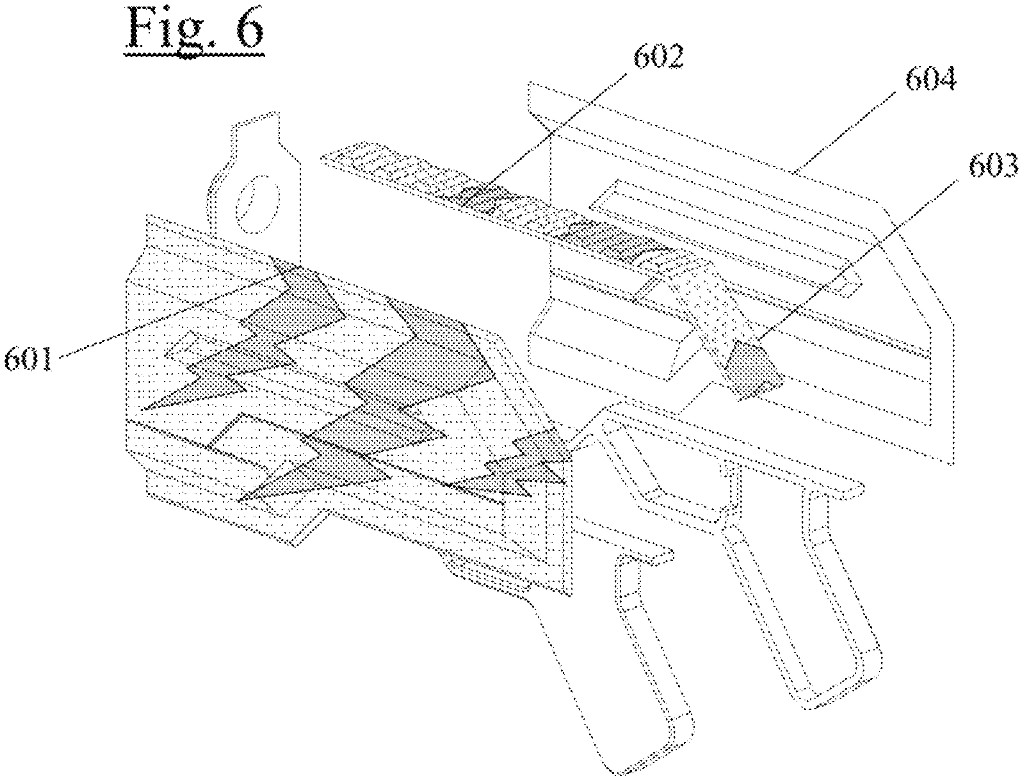
FIG. 6 displays an exploded rear three-quarter view of the outer shell of the embodiment, with said view illustrating an aggregate coating across a plurality of outer shell parts.
Figure 7:
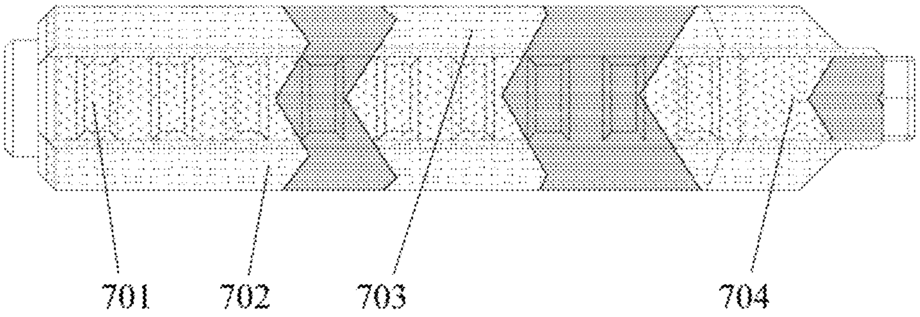
FIG. 7 displays a top view of the outer shell of the embodiment, with said view illustrating an aggregate coating across a plurality of outer shell parts.
Figure 8:
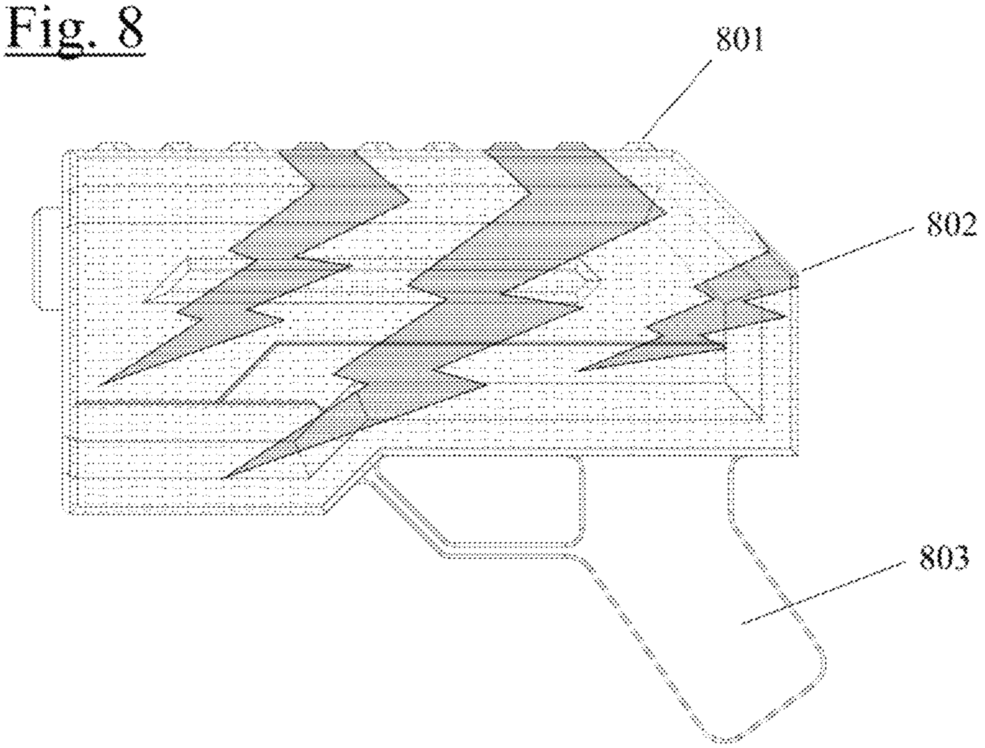
FIG. 8 displays a side view of the outer shell of the embodiment, with said view illustrating an aggregate coating across a plurality of outer shell parts.
Figure 9:
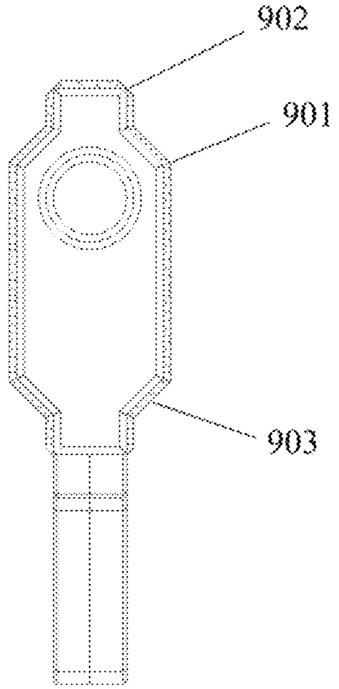
FIG. 9 displays a front view of the outer shell of the embodiment, with said view illustrating an aggregate coating across a plurality of outer shell parts.
Figure 10:
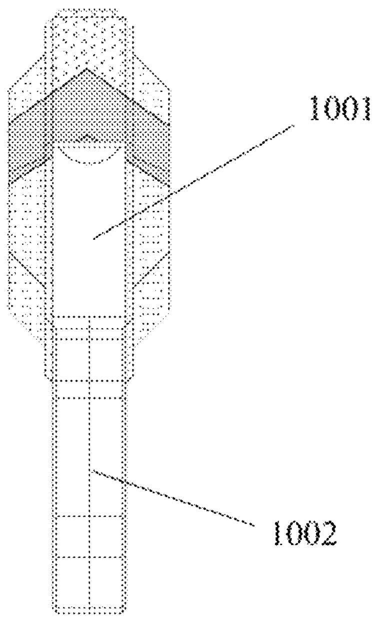
FIG. 10 displays a rear view of the outer shell of the embodiment, with said view illustrating an aggregate coating across a plurality of outer shell parts.

Referring now to FIGS. 1 and 2, this is an outer shell 101 of a projectile launcher comprising a plurality of shell parts: a top rail 201, a left side 202, a right side 203, a left grip half 204, a right grip half 205, and a front barrel 206. In a finished projectile launcher, the outer shell 101 would house internal mechanisms to launch a projectile, such as a foam dart, out of a hole 209 in the front barrel 206 as well as comprise user interactable hardware such as a trigger or a cocking handle. Each outer shell part abuts one or more other to form the outer shell, with some parts, such as the left grip half 204 and right grip half 205 abutting along a mid-plane of the outer shell, while parts such as the left side 202 and the right side 203 abut to either side of the top rail 201 and the front barrel 206 comprises an outer edge that follows the contour of the front edges 208, 207 of the left side 202 and right side 203 respectively. Lastly, the geometry of the top rail 201, left side 202, and right side 203 are designed such that they may be optimal to receive a sub-coating on their outward-facing surfaces, where the top rail acts as a bridge part in the width direction between the left side and right side to further accommodate the ability for the left side and right side to comprise geometry that is optimised to receive a sub-coating.

Referring now to FIGS. 3 to 10, this is a preferred embodiment of an outer shell 301 of a decal-coated projectile launcher, structurally equivalent to the plain outer shell 101 of FIGS. 1 and 2, comprising a plurality of discrete shell parts: a top rail 401, a left side 402, a right side 403, a left grip half 404, a right grip half 405, and a front barrel 406. In this embodiment, the outer shell 301 comprises an aggregate coating which comprises three sub-coatings: a first sub-coating 302 on an outer surface of the top rail 401, a second sub-coating 304 on an outer surface of the left side 402, and a third sub-coating 504 on an outer surface of the right side 403, such that the aggregate coating spans across the three shell parts in a visually continuous way; the left grip half 404, right grip half 405, and the front barrel 406, however, are all plain plastic injection moulded parts without a sub-coating.

The aggregate coating comprises three foreground decal elements 501 502 503 that each span throughout the sub-coatings 302 304 504, and consequently across the top rail 401, left side 402, and right side 403 such that the foreground decal elements appear undisturbed when the outer shell is assembled. For instance, the shell parts 401 402 interface at said abutting edges 601 602 and as the first sub-coating 302 is contiguous with the first abutting edge 602 and the second sub-coating 304 is contiguous with the second abutting edge 601, the first foreground element 501 appears to span across the abutting edges 601 602 and over to the adjacent outer shell part; equivalently, the second and third foreground decal elements 502 503 also span across the abutting edges and over to corresponding adjacent outer shell parts. Furthermore, in this embodiment, the aggregate coating includes three background decal elements 701 702 703, that are each discreetly situated within the first sub-coating 302, second sub-coating 304, and third sub-coating 504, respectively. In this embodiment, the second sub-coating’s background decal element 702 and the third sub-coating’s background decal element 703 are a substantially similar decal element, while the first sub-coating’s background decal element 701 is different. Each of these background decal elements are discretely located on their respective sub-coatings, and consequently their respective outer shell parts; although the aggregate coating is visually continuous across the abutting edges 601 602 and the abutting edges 603 604, none of the background decal elements 701 702 703 span across the edges and over to the adjacent outer shell part.

It should be noted that this particular aggregate coating’s distinction between how the foreground decal elements 501 502 503 span across discrete sub-coatings and outer shell parts, and how the background decal elements 701 702 703 are separated and confined within a corresponding sub-coating and shell part, serve as an example that, although the entire aggregate coating may be designed to appear continuous across multiple outer shell parts, the decal elements that comprise it may be either discrete or visually continuous, depending on the desired artistic design.

In this embodiment, each outer shell part that comprises the aggregate coating is optimised to be able to receive a sub-coating by an inkjet printing method, such that the outer shell parts do not have outer surfaces that require a sub-coating and extend beyond a height range of greater than a maximum printing range of the inkjet printer; presently, a value of 30 mm exists as this maximum height range, assuming the printer head has clearance to be located near said height range. Accordingly, the top rail 401 comprises a top sub-coating height 801 and a bottom sub-coating height 802, such that the distance between them is less than 15 mm, and the left side 402 comprises a top sub-coating height 901 and a bottom sub-coating height 902, such that the distance between them is less than 10 mm. Additionally, the outer shell parts do not have outer faces intended to receive a sub-coating that are also inclined to a printing plane greater than a maximum printing angle of the inkjet printer; presently a value of 60° exists as this maximum angle of incline. Accordingly, the top rail 401 comprises faces that are all below 60°, such as a rear corner face 704 that is inclined at approximately 45° to a printing plane, and the left side 402 comprises sub-coating-comprising faces that are all below 60°, such as an angled face 903 that is inclined at approximately 45° to a printing plane. It should be noted that referenced printing planes for each outer shell part are not the same; such printing planes refer to a momentary plane that is orthogonal to a direction that the outer shell part is receiving a sub-coating from. Furthermore, it should also be noted that the right side 403 is substantially identical, but mirrored, to the left side 402 such that it comprises the same height range and maximum surface incline specifications.

Due to the left grip half 404 and right grip half 405 not comprising the aggregate coating, their geometry does not need to be optimised as such; this allows the left grip half 404 and right grip half 405 to comprise surfaces that span around 90° angles in order to have their abutting edge 1002 at a midplane of the outer shell and require fewer total parts in the assembly of the outer shell 301. Contrarily, although these two outer shell parts are not optimised to receive a sub-coating on all their geometry, a decal could still be easily deposited onto their side faces 803 in a single printing orientation; this sub-coating would just not be easily continued onto all surfaces of the outer shell parts without reorienting the outer shell part.

When assembled, the outer shell 301 comprises a rear opening 1001 which may be used to allow access to internal volumes or comprise user-interfaceable parts that actuate internal mechanisms of the decal-coated projectile launcher. In this embodiment, the rear opening 1001 serves as an opening that a lever may extend from, such that the lever may be operated by the user to set a spring-powered action. In other embodiments it may be preferable to comprise similar openings that lead into the interior of the outer shell and may facilitate features including, but not limited to, triggers, levers, buttons, projectile magazines, LED lights, speakers, digital displays, or battery compartments. Equivalently, the outer shell 301 comprises a trigger opening 303 which may be used to allow access to internal volumes or comprise user-interfaceable parts that actuate internal mechanisms of the decal-coated projectile launcher. In this embodiment, the trigger opening 303 serves as an opening that a trigger may extend from, such that the trigger may be operated by the user to release a spring-powered action. Furthermore, if the top rail 401 comprised a vertical face extending downward to cover the rear opening 1001 then that face would not be optimised to receive a sub-coating by an inkjet printer in the same way that the top rail 401 is currently optimised as such.

Furthermore, it should be noted that the construction of the inner mechanisms of a projectile launcher should be apparent to those skilled in the art, thus the description of this invention focuses primarily on the novelty of the outer shell of a decal-coated projectile launcher.

It is preferable in this embodiment that each outer shell part that comprises a sub-coating that substantially covers the outer surface. Such a comprehensively covered outer shell part provides a sub-coating that appears intrinsic to the outer shell part's material, rather than a thinly applied layer; this increases the perceived value and perceived quality of the product. Common exemptions that may be made to this preferable feature include functional features such as fastener holes, or other geometry required to fabricate and assemble the projectile launcher.

A preferred method of producing a decal-coated projectile launcher is now described: A decal-coated projectile launcher may be produced by constructing a plurality or outer shell parts, locating each outer shell part to receive a sub-coating, using a piezo electric inkjet printer to dispense a UV curable, pigment-based, ink to apply a sub-coating onto each outer shell part, directing UV light onto each outer shell part to bond the sub-coating to the outer surface of the outer shell part, and assembling a projectile launcher using the now coated outer shell parts to form at least a part of the outer shell of the projectile launcher. To produce a high-quality decal-coated projectile launcher, it is preferable to ensure that each outer shell part comprises geometry that is optimal to receive a sub-coating from an inkjet printer, as previously mentioned, particularly where the outer surface of each outer shell part to receive a sub-coating do not span a height range of greater than 30 mm and are not inclined to the horizontal printing plane by more than 60°.

The method of this embodiment utilises inkjet printing technology to apply an aggregate coating to the projectile launcher since inkjet printers can print full colour, high resolution images, and may utilise UV curable inks to hasten the drying process and adhere to a range of material types. Furthermore, since inkjet printing deposits microdroplets from a printer head that is not in contact with the printed surface, it allows for variances in height of the subject's geometry, including angled surfaces, offset surfaces, protrusions, indentations, bumps, textured surfaces, or any other features that cause variances in height in relation to the printer head.

Figure 11:
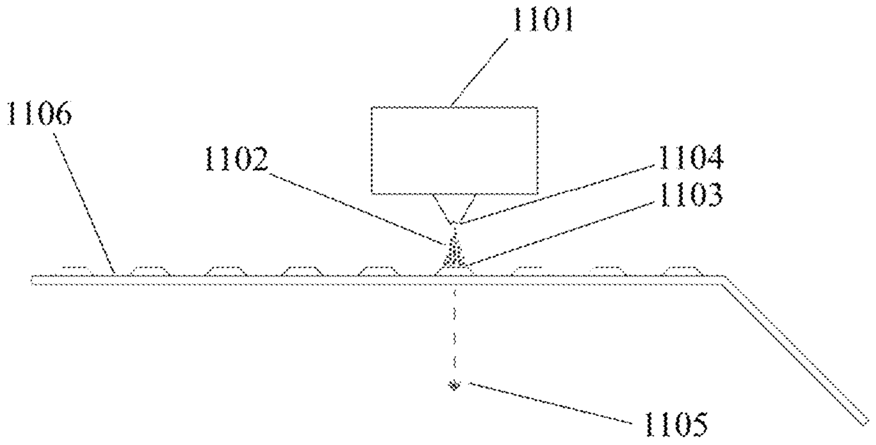
FIG. 11 displays a side view of an inkjet printer head depositing ink onto a top face of an outer shell part, wherein the top face is orthogonal to the direction of printing.
Figure 12:
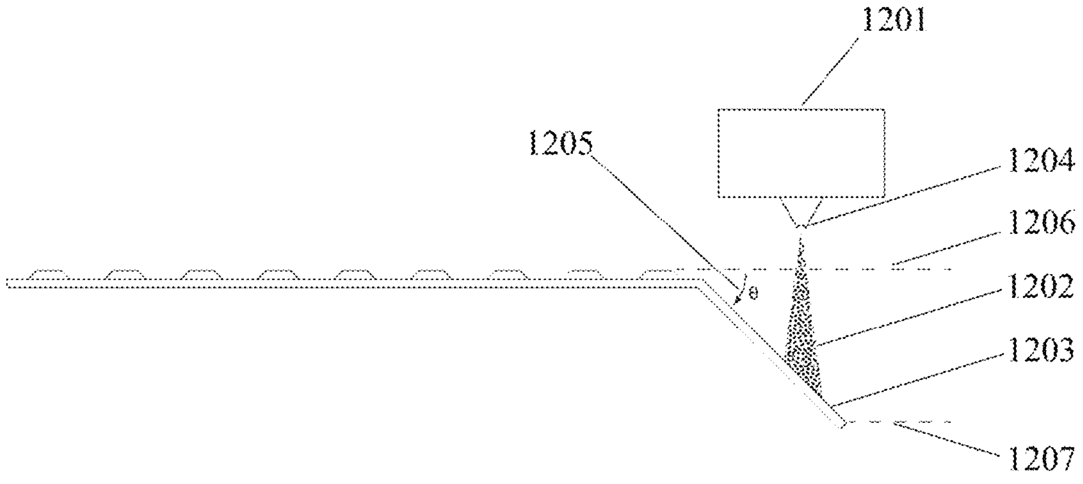
FIG. 12 displays a side view of an inkjet printer head depositing ink onto a face of the outer shell part of FIG. 11, wherein the face is inclined to the direction of printing.

Referring now to FIGS. 11 and 12, an illustration of the previously described method can be seen; namely, an outer shell part 1106 is shown to be receiving a sub-coating onto its outer surface from an inkjet head 1101 in a first position. The inkjet head 1101 is depositing a jet of ink 1102 in a printing direction 1105 onto a top face 1103, where the nozzle 1104 of the inkjet head is spaced a minimum distance away from the top face 1103. Additionally, the inkjet head 1101 is shown in a second position 1201 to be depositing a jet of ink 1202 from the nozzle 1204, which is at the same height as the first position, onto an inclined face 1203 where the inclined face is inclined to a printing plane at an incline angle 1205, where the incline angle 1205 is 45°. The geometry of this outer shell part 1106 is optimised to receive a sub-coating, such that the height range of the part defined by a top printing height 1206 and a bottom printing height 1207 is less than 30 mm and the maximum inclination of a surface, related to a printing plane, is less than 60°; specifically, the height range of this outer shell part 1106 is approximately 15 mm, and the maximum angle of inclined surfaces is approximately 45°.

Figure 13:
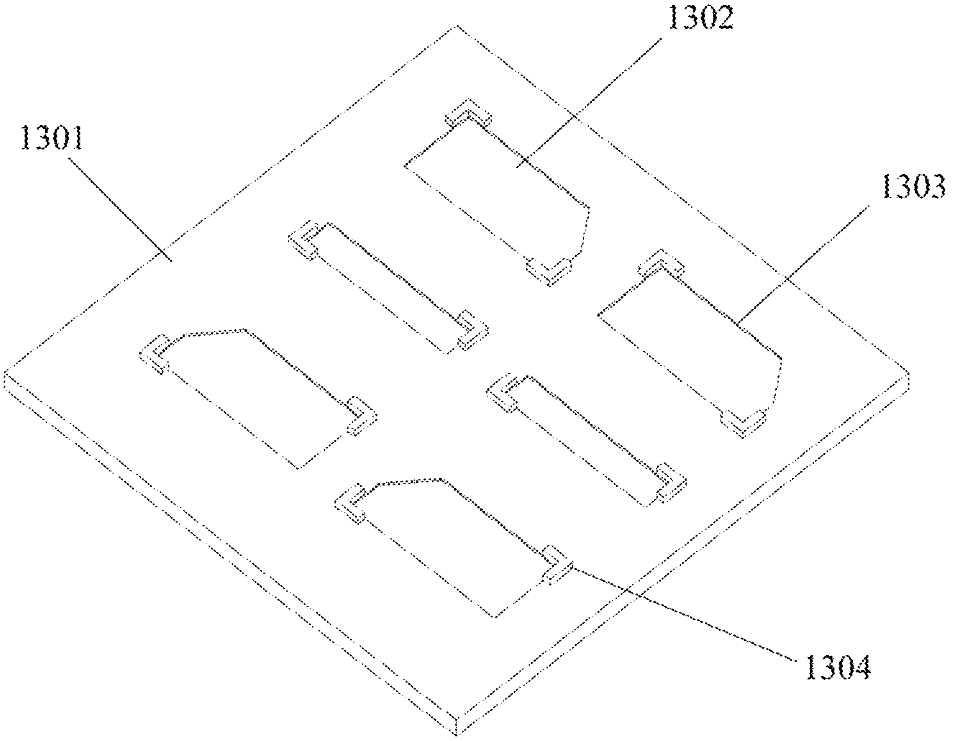
FIG. 13 displays a perspective view of a jig tray that may receive and register a plurality of shell parts during printing of said shell parts.

Referring now to FIG. 13, an illustration of a jig tray 1301 can be seen; this jig tray may be used in a preferred embodiment of the previously described method. The jig tray comprises a plurality of shell part spaces 1302 such that each of the shell part spaces may receive a shell part. Each shell part space comprises at least two retaining pegs 1304, such that the retaining pegs fix said shell part from translating or rotating when received by the corresponding shell part space. Each shell part may have an outer edge contour, and correspondingly, each shell part space's retaining pegs 1304 are designed to abut said outer edge contour. Furthermore, each shell part space may comprise a slight depression with an outer edge contour 1303 that interfaces with said outer edge of the corresponding shell part the shell part space is designed to receive.

It is a preferred method to injection mould the outer shell parts out of a polymer, such as PP, PE, PVC, or other common plastics; this allows the base colour of the outer shell part to be optimised, such as plain white, to facilitate the coloured aggregate coating. Printing onto a coloured material dulls the ink's colour due to subsurface scattered light from the base surface transmitting that colour throughout the aggregate coating, therefore it is ideal to ensure that the base colour is substantially monochromatic and to ensure that the base colour comprises substantial radiance to induce greater subsurface scattering and highlight the colours of the aggregate coating.

Furthermore, an alternative embodiment of the method may support application of a sub-coating on outer shell parts with geometry that includes substantial height variances, substantially inclined faces, 90° spanning surfaces, and/or other features suboptimal to print on from a single printing direction; such method may be achieved by printing a sub-coating in discrete passes, where a given outer shell part is situated in a first orientation and a first printing pass may apply a sub-coating on all feasible faces of the outer shell part, and subsequently the outer shell part is manipulated to a secondary orientation such that a secondary printing pass may continue the sub-coating on surfaces that were previously problematic to print on while in the first orientation. Naturally, this alternative embodiment may comprise as many additional orientations of the given outer shell part and corresponding and printing passes as is required to satisfy the sub-coating requirements.

Furthermore, said alternative method may preferably apply a sub-coating in discrete passes that correspond to discrete orientations using an articulated joint such that the outer shell part be printed at a single print station with automated mechanism that manipulates the outer shell part to each discrete orientation. This method may be used for a single outer shell part, or even printing onto an assembled outer shell such that an assembled outer shell of a projectile launcher may treated as a single part that is manipulated into discrete orientations for corresponding discrete printing passes.

Furthermore, it is preferable that the method prints a decal based on one or more rasterised digital images. This allows the decal to be designed in a scalable vector format, and subsequently rasterised to an optimal DPI for the inkjet printer.

Furthermore, when printing onto an outer shell part that comprises inclined faces from a single direction, when the printing direction is not orthogonal to the inclined face the resultant decal elements will appear proportionally correct when viewed from said original printing direction, however when viewed orthogonally to the inclined surface, the resultant decal elements may appear stretched. Therefore, in alternative embodiments of the method, it may be preferable to rasterise the digital image that should be printed such that portions of the image are squeezed in one or more directions and the resultant decal will appear proportionally correct when viewing faces that are inclined to the printing direction from an orthogonal perspective. Such a modification to the printed image however will result in proportional distortion when viewing the inclined surface along the printing direction; consequently, when designing the decal, it should be considered what the most nominal, or most important, angle from which the user will be viewing the aggregate coating, or the relevant sub-coating will be.

The invention has been described with examples relevant to its current form, however, potential embodiments will include any form that is within the scope of the appended claims. It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of creating a projectile launcher having two abutting shell parts configured to be selectively separable from one another, a first shell part of the two abutting shell parts defining a first surface and a second shell part of the two abutting shell parts defining a second surface, the first surface and the second surface each forming at least part of an outermost surface of the projectile launcher and each of the first surface and the second surface has at least two faces that are not coplanar and non-parallel, the method comprising:

when said two abutting shell parts are separated from each other, depositing ink onto the first and second surfaces to form a first sub-coating on the first surface and a second sub-coating on the second surface in a single printing orientation on the at least two faces; and assembling the first and second shell parts to abut each other and to position the first sub-coating contiguously to the second sub-coating to define an aggregate coating on the outermost surface of the projectile launcher that is visually continuous.

2. The method as claimed in claim 1 wherein:

the first sub-coating on the first surface is deposited in a first direction;

the second sub-coating on the second surface is deposited in a second direction; and the first and second directions, when the first and second shell parts are assembled, are at an angle relative to one another between 3° and 120°.

3. The method as claimed in claim 1 further including:

depositing ink onto the first and second surfaces at an angle of incidence no greater than 60° relative to the respective normal direction of the first and second surfaces.

4. The method as claimed in claim 1 further including depositing ink onto the outer surface at an angle of incidence of less than 60° relative to the normal direction of the outer surface.

5. The method as claimed in claim 1, wherein said ink is UV curable, the method further comprising curing the ink on each shell part with UV light, prior to assembly of the outer shell.

6. The method as claimed in claim 1, wherein said ink is a pigment-based ink.

7. The method as claimed in claim 1, wherein the ink deposited onto each of the first outer surface and the second outer surface is cumulatively deposited across a plurality of print passes.

8. The method as claimed in claim 7, wherein a number of print passes during which ink is deposited onto a point on said first outer surface in a direction of printing normal to the surface is less than a number of print passes during which ink is deposited onto said point on said first outer surface angled to the surface.

9. The method as claimed in claim 1, wherein said ink is deposited using an inkjet printer.

10. The method as claimed in claim 9 wherein said inkjet printer is a piezo electric inkjet printer.

11. The method as claimed in claim 1, further comprising receiving at least one said shell part onto a jig tray, wherein said jig tray is shaped and configured to allow said shell part to register with the jig tray for subsequent printing.

12. The method as claimed in claim 11, wherein said jig tray is shaped and configured to receive a plurality of said shell parts to allow said plurality of shell parts to register with said jig tray for subsequent printing.

* * * * *